United States Patent [19]

Bentz

[11] Patent Number: 5,430,082
[45] Date of Patent: Jul. 4, 1995

[54] ELASTOMER-FORMING COMPOSITION

[75] Inventor: Peter O. Bentz, Taunusstein, Germany

[73] Assignee: Dow Corning GmbH, Rheingaustrasse, Germany

[21] Appl. No.: 169,790

[22] Filed: Dec. 20, 1993

[30] Foreign Application Priority Data

Jan. 14, 1993 [GB] United Kingdom ............... 9300611

[51] Int. Cl.⁶ .............................................. C08K 5/54
[52] U.S. Cl. .................................. 524/264; 524/268; 525/478; 528/15; 528/31; 528/32; 556/434
[58] Field of Search ............. 524/264, 268; 525/478; 556/434; 528/15, 31, 32

[56] References Cited

U.S. PATENT DOCUMENTS

| | | | |
|---|---|---|---|
| 4,087,585 | 5/1978 | Schulz | 428/429 |
| 4,737,562 | 4/1988 | Chaudbury et al. | 528/15 |
| 4,990,560 | 2/1991 | Ikeno et al. | 525/478 |
| 5,064,891 | 11/1991 | Fujiki et al. | 524/264 |
| 5,283,307 | 2/1994 | Larson | 524/264 |

FOREIGN PATENT DOCUMENTS 326712  8/1989  European Pat. Off. ............ 524/268

*Primary Examiner*—Melvyn I. Marquis
*Assistant Examiner*—Mark D. Sweet
*Attorney, Agent, or Firm*—William F. Boley

[57] ABSTRACT

An elastomer-forming silicone composition comprising (A) a vinyl-organopolysiloxane, (B) an organosilicon compound, (C) a noble metal catalyst and (D) an adhesion promoter characterised in that the adhesion promotor is the product of the mixture or reaction of (1) an organosiloxane compound having at least two trialkoxysilyl groups, (2) an unsaturated alcohol having at least one $\alpha,\beta$-unsaturated alkenyl group and has improved adhesion without the toxic disadvantages of the prior art.

11 Claims, No Drawings

ELASTOMER-FORMING COMPOSITION

This invention relates to elastomer-forming compositions which comprise silicones. The invention is compositions which have improved unprimed adhesion on many Elastomer-forming silicone compositions have been known for some time. A particularly useful type of silicone elastomer-forming compositions is the type where the elastomer is formed via an addition reaction. This type of composition has the advantage that upon curing by-products are formed, and hence the resulting product has substantially the same dimension as the uncured elastomer. This is not the case for example with products which cure by condensation reactions where the evolution a by-product, e.g. alcohol, will cause the product shrink to some extent upon curing. Many of these reaction elastomer-forming compositions require priming the surface in order to ensure good adhesion thereto. is particularly true where the surface is metal or a plastic.

Attempts have been made to produce addition elastomer-forming compositions which have improved unprimed adhesion to metal or plastic substrates. For example U.S. Pat. No. 4,737,562 describes a composition which reacts to form a cured silicone elastomer, which uses a liquid adhesion promoter, consisting essentially of (1) a first organo-silicon compound of the general formula $(RO)_3SiCH_2CH_2Si(OR)_3$ where R represents an alkyl or haloalkyl radical containing from 1 to 8 carbon atoms, inclusive, (2) a second organosilicon compound containing in each molecule at least one silicon-bonded group, hydroxyl group or a group which is hydrolisable to a hydroxyl group and at least one silicon-bonded group which may be the same as above, a hydrogen atom or an organofunctional group which can react with the curable organopolysiloxane or the crosslinker used to form the elastomer and (3) a catalyst. It has been found, however, that the composition according to the cited specification, though very effective in improving adhesion uses toxic materials represented by ingredient (2) above. There is therefore a need to improve the composition in such a way that it will become less toxic.

We have now found that an improved composition is obtained by using as adhesion promoter the product resulting from a mixture, or reaction, of an organosiloxane compound having at least two trialkoxysilyl groups linked directly or indirectly to a silicon atom and an unsaturated alcohol, e.g. an allylether of a polyol.

According to the invention there is provided an elastomer-forming silicone composition comprising (A) an organopolysiloxane having an average of about two silicon-bonded vinyl groups per molecule, (B) an organosilicon compound having on average at least 3 silicon-bonded hydrogen atoms per molecule, (C) a noble metal catalyst and (D) an adhesion promoter which is the product of the mixture, or reaction, of (1) an organosiloxane compound having at least two trialkoxysilyl groups of the formula $-R'Si(OR'')_3$ linked to a silicon atom wherein R' denotes a divalent hydrocarbon linkage and R'' denotes an alkyl group having up to 6 carbon atoms with (2) an unsaturated alcohol having at least one $-CZ_2-OH$ group and at least one $\alpha,\beta$-unsaturated alkenyl group and having the general formula $[HO-C_iZ_{2i}]_a-C-(R'')_{4-a-b}-[X-CH=CH_2]_b$ wherein Z denotes a hydrogen atom or a group R'', X denotes a divalent hydrocarbon group optionally having one or more ether oxygen linkages, a and b independently have a value of from 1 to 3, the sum of $a+b$ having a value of from 2 to 4 and i has a value of from 1 to 12.

Component (A) of the composition of the invention is an organopolysiloxane which preferably has the general formula $Vi-[SiR_2O]_n-SiR_2Vi$ wherein Vi denotes a vinyl group, R denotes an organic group, which is selected from monovalent hydrocarbon or halogen-substituted hydrocarbon groups having at most 8 carbon atoms per group, and wherein n is an integer. These preferred organopolysiloxanes are substantially linear polymers, but small amounts of trifunctional siloxane groups or tetrafunctional siloxane groups may also be present. Such groups would result in a certain amount of branching in the polymer. Although preferred organopolysiloxanes are end-blocked with vinyldiorganosiloxane units it is also possible that vinyl groups only occur along the chain of the polymer. Suitable polymers will have a viscosity in the range of from 20 $mm^2/s$ to 20 $m^2/s$, preferably 100 $mm^2/s$ to 50,000 $mm^2/s$. Suitable groups R include alkyl, alkenyl, aryl, chlorine or fluorine substituted alkyl groups, alkaryl and aralkyl groups. Examples of suitable groups R are methyl, ethyl, propyl, hexyl, phenyl, vinyl, butenyl, hexenyl, methylphenyl, trifluoropropyl and $\beta$(perfluoropropyl)ethyl. It is most preferred that at least 80% of all groups R are methyl groups. Most preferred organopolysiloxane (A) is therefore a $\alpha,w$-vinyl end-blocked polydimethylsiloxane. Suitable organopolysiloxanes (A) are well-known and commercially available polymers.

Component (B) is preferably an organohydrogen siloxane having on average at least 3 silicon-bonded hydrogen atoms per molecule, any remaining substituents of the silicon atoms being monovalent hydrocarbon groups having up to 8 carbon atoms. These materials are also well-known in the art. The silicon-bonded hydrocarbon substituents are preferably selected from alkyl groups having from 1 to 6 carbon atoms and phenyl groups. The organohydrogen siloxanes can be homopolymers, copolymers or mixtures thereof which comprise units such as $R_2SiO$, $R_3SiO_{\frac{1}{2}}$, $RHSiO$, $HSiO_{3/2}$, $RSiO_{3/2}$, $R_2HSiO_{\frac{1}{2}}$ and $SiO_2$ wherein R is as defined above. No more than 1 hydrogen atom should be linked to any one silicon atom. It is preferred that at least 80% of all R groups are lower alkyl groups, most preferably methyl groups. Specific examples of suitable organosilicon compounds (B) are copolymers of trimethylsiloxane, dimethylsiloxane and methylhydrogensiloxane units, cyclic methylhydrogensiloxanes and copolymers of dimethylhydrogensiloxane units, dimethylsiloxane units and methylhydrogensiloxane units. The organosilicon compounds (B) preferably have at least 5 silicon-bonded hydrogen atoms per molecule and are most preferably copolymers of trimethylsiloxane units, methylhydrogensiloxane units and optionally dimethylsiloxane units and have a viscosity of from 15 to about 500 $mm^2/s$ at 25° C.

The noble metal catalyst, which is used as Component (C) of the composition of the invention, is a group VIII metal or a complex or compound thereof. Preferably Component (C) is a platinum compound or complex. This component is effective in catalysing the addition reaction between the vinyl groups of Component (A) and the silicon-bonded hydrogen atoms of Component (B). This addition reaction is well known and has been described in a number of textbooks and publications. Suitable platinum compounds and complexes include chloroplatinic acid, platinum acetylacetonate, complexes of platinous halides with unsaturated compounds such as ethylene, propylene, organovinylsiloxanes and styrene, hexamethyldiplatinum, $PtCl_2.PtCl_3$ and $Pt(CN)_3$. The preferred platinum catalysts are complexes of platinum compounds and vinyl siloxanes, e.g. those formed by the reaction of chloroplatinic acid and divinyltetramethyl disiloxane. Sufficient of the catalyst should be employed to provide a homogenous and effective cure of the composition. The preferred proportion of platinum catalyst is usually that which will provide from about 1 to about 40 parts by weight of Pt per million parts by weight of Components (A) and (B) combined.

Component D is the product which results from mixing or reacting together (1) an organosiloxane compound having at least two trialkoxysilyl groups of the formula $-R'Si(OR'')_3$ linked to a silicon atom, wherein $R'$ denotes a divalent hydrocarbon linkage and $R''$ denotes an alkyl group having up to 6 carbon atoms and (2) an unsaturated alcohol having at least one $-CZ_2-OH$ group and at least one $\alpha,\beta$-unsaturated alkenyl group and having the general formula $[HO-C_iZ_{2i}]_a\text{-}C\text{-}(R'')_{4-a-b}\text{-}[X-CH=CH_2]_b$ wherein Z denotes a hydrogen atom or a group $R''$, X denotes a divalent hydrocarbon group optionally having one or more ether oxygen linkages, a and b independently have a value of from 1 to 3, the sum of a+b having a value of from 2 to 4 and i has a value of from 1 to 12.

Organosiloxane (1) is a siloxane which may be a substantially linear siloxane, a branched siloxane or a cyclic siloxane. It is preferred that the siloxane is a short chain material preferably having no more than 20 silicon atoms, more preferably no more than 10 silicon atoms. Units of the siloxane may be selected from $SiO_2$, $R''SiO_{3/2}$, $R_2''SiO$, $R_3''SiO_{\frac{1}{2}}$ units and units of these formulae in which one of the oxygen atoms linked to silicon is replaced with a group $-R'Si(OR'')_3$ in which $R'$ and $R''$ are as defined above. A group $R''$ may be any alkyl group having up to 6 carbon atoms but preferably is a methyl or ethyl group. It is preferred that at least 80% of all $R''$ groups, most preferably substantially all $R''$ groups, are methyl groups. The group $R'$ denotes a divalent hydrocarbon group preferably having from 2 to 6 carbon atoms. Most preferred $R'$ groups are alkylene groups, e.g. methylene, dimethylene, trimethylene, isobutylene and hexylene. Particularly useful siloxane (1) are $Si[OSi(CH_3)_2\text{-}CH_2CH_2\text{-}Si(OCH_3)_3]_4$ and $(CH_3)_3Si[OSi(CH_3)_2]_4[OSi(CH_3)]_2OSi(CH_3)_3$
|
$CH_2CH_2-Si(OCH_3)_3$.

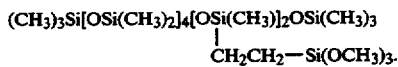

Siloxane (1) may be prepared by known routes, for example by reacting siloxanes having silicon bonded hydrogen atoms with trialkoxyalkenylsilane, e.g. trimethoxyvinylsilane, in the presence of a platinum catalyst.

Unsaturated alcohol (2) is a commercially available material. It has the general formula $[HO-C_iZ_{2i}]_a\text{-}C\text{-}(R'')_{4-a-b}\text{-}[X-CH=CH_2]_b$ wherein Z denotes a hydrogen atom or a group $R''$, X denotes a divalent hydrocarbon group optionally having one or more ether oxygen linkages, a and b independently have a value of from 1 to 3, the sum of a+b having a value of from 2 to 4 and i has a value of from 1 to 12. It is preferred that the majority of Z groups is hydrogen, most preferably all Z groups being hydrogen. The value of i is preferably from 1 to 4, most preferably 1 $R''$, when present, is preferably a methyl or ethyl group. X is preferably an alkylene group, optionally interrupted by one or more ether oxygen atoms. Particularly preferred is a group of the formula $R^*\text{-O-}R^*$, wherein $R^*$ is an alkylene group having from 1 to 4 carbon atoms, most preferably methylene. Preferably unsaturated alcohol (2) is an allylether of a polyol having at least one -COH group and one allyl group. Preferred allylether (2) is commercially available and is more preferably a mono- or diallylether. A particularly useful compound is trimethylolpropanemonoallylether or trimethylolpropanediallylether.

Component (D) may be prepared by purely mixing siloxane (1) and unsaturated alcohol (2) either prior to admixture with the other components of the composition, or by addition of the two ingredients separately in the composition and mixing them in situ possibly in the presence of a catalyst. Alternatively ingredients (1) and (2) may be prereacted by heating them together in the presence of a catalyst, e.g. a titanium compound such as a tetraalkoxytitanate or a chelated titanate. Reaction may be carried out at elevated temperatures, e.g. 50° to 150° C., preferably about 100° C.

Additional ingredients may also be used in compositions according to the invention. These include fillers, flame retardant additives, heat stabilising additives, additional adhesion promoting agents, pH stabilising agents, mildewicides, colorants, pigments and solvents. For example suitable fillers include reinforcing silica fillers such as pyrogenically produced silica and precipitated silica, resinous materials for example those comprising units of the formula $R_3SiO_{\frac{1}{2}}$ and units of the formula $SiO_2$, alumina, finely divided quartz, calcium carbonate, zinc oxide, titania and zirconium silicate. Fillers which are added to the compositions of this invention are preferably treated with filler treating agents to improve their compatibility with the other components of the composition. Such agents are generally known in the art and include for example hexamethyldisilazane, alkylalkoxysilanes, methylhalogenosilanes and short chain silanol end-blocked polydimethylsiloxanes. The filler may constitute up to about 50% by weight of the total composition but preferably constitutes from 5 to 40% by weight of the composition. The preferred filler is a reinforcing silica. Additional adhesion promoting agents include epoxy-functional silanes, e.g. those disclosed in U.S. Pat. No. 4,087,585. Small amounts of water may also be added and are found to improve the adhesion in some cases. In such cases the addition of water is of course preferred. Amounts of water are small and amount to no more than 20% of the amount of Component (D) used.

Compositions according to the present invention preferably have 100 parts by weight of Component (A), sufficient of Component (B) to give from 0.5 to 3 silicon-bonded hydrogen atoms per vinyl group present in Component (A), from 0.01 to 5 parts by weight of Component (D) as well as the appropriate amount of catalyst (C) as mentioned above.

Compositions according to the invention are curable at relatively low temperatures and still provide good unprimed adhesion to a large number of substrates. Curing temperatures may vary from ambient temperature to higher temperatures, e.g. 50° to 150° C. Suitable substrates include aluminium, polyvinylchloride, polycarbonate, glass fibre reinforced (GFR) epoxy resin, copper, glass, polyetherimide, poly(phenyleneoxide) and poly(phenylene sulfone).

There now follow a number of examples and comparative examples which illustrate the benefits of the invention, in which all parts and percentages are by weight unless otherwise mentioned.

Preparation of Adhesion Promoting Component D

Component D1

(tetrakis[2-(trimethoxysilyl)ethyldimethylsiloxy]silane) was prepared in a glass flask fitted with thermometer and addition funnel. 1.25 mole of trimethoxyvinylsilane and 4 drops of a solution of a platinum complex containing 3.5% of platinum were placed in the flask. The mixture was heated to 70° C., followed by the addition of 0.3 mole of tetrakis(dimethylsiloxy) silane at a rate to maintain the reaction mixture at a temperature between 80° and 100° C. After this addition the mixture was heated to 120° C. for one hour after which all volatile compounds were removed under reduced pressure. The reaction resulted in 264 g of the title product.

Component D2

46g of Component D1 and 11g of a blend of 90% of trimethylolpropanediallylether and 10% trimethylolpropanemonoallylether and 0.2 g of tetra-n-butyl-titanate were mixed together and heated to 110° C. for one hour, after which all volatile compounds were removed under reduced pressure. This yielded 55 g of the adhesion promoter Component D2.

Component D3

In a glass flask fitted with thermometer and addition funnel, 421 g of trimethoxyvinylsilane and 0.07 g of a solution of a platinum complex containing 3.5% of platinum were mixed. The mixture was heated to 70° C. followed by the addition over a period of one hour of 331 g of a trimethylsiloxy end-blocked organopolysiloxane having 37.5 mole % dimethylsiloxane units and 62.5 mole % methylhydrogensiloxane units at a rate to maintain the reaction mixture at a temperature between 80° and 100° C. After this addition the mixture was heated to 120° C. for five hours after which all volatile compounds were removed under reduced pressure. The reaction resulted in 708 g of Component D3.

Component D4

90 g of Component D3 and 14.3 g of a blend of 90% of trimethylolpropanediallylether and 10% trimethylolpropanemonoallylether and 0.3 g of tetra-n-butyl-titanate were mixed together and heated to 110° C. for three hours, after which all volatile compounds were removed under reduced pressure. This yielded 102 g of adhesion promoter Component D4.

EXAMPLE 1

A composition was prepared consisting of 68.8 parts of a mixture of 80% by weight of a dimethylvinylsiloxy endblocked polydimethylsiloxane with 20% by weight of a dimethylvinylated and trimethylated silica having a viscosity of 35 Pa.s, 37.5 parts of ground quartz powder, 0.13 part of a platinum composition containing 6% platinum, 3 parts of a trimethylsiloxy end-blocked organopolysiloxane having 37.5 mole % dimethylsiloxane units and 62.5 mole % methylhydrogensiloxane units, 0.09 parts of cyclomethylvinylsiloxane and 0.5 part of a colour pigment. To this composition was added 0.1 part tetra-n-butyl-titanate, 1 part of Component D1 and 1 part of Component D2. The composition was then coated onto sheets of aluminium, GFR epoxy resin, glass and copper with a layer of 1 to 2 mm. The coated sheets were then placed in an oven for one hour at 100° C., and after removal from the oven stored for 24 hours at room temperature. The cured silicone elastomer was then attempted to be peeled away from the sheets and the amount of cohesive failure noted (100% cohesive failure means 100% adhesion). In all cases 100% cohesive failure was observed.

Comparative Example 1

The composition of Example 1 was prepared without Components D1 or D2. After testing for adhesion, 0% cohesive failure was noticed (i.e. no adhesion).

EXAMPLE 2

The composition of Example 1 was prepared without Component D1. The composition was coated onto sheets as explained in Example 1 and one set were cured at 100° C. for hour, while another set-was cured at 80° C. for 2 hours. After storage for 24 hours they were tested for cohesive failure. Test results in % cohesive failure are given in Table I.

TABLE I

| sheet | cured 100° C. | cured 80° C. |
| --- | --- | --- |
| aluminium | 100% | 100% |
| GFR epoxy resin | 90% | 90% |
| glass | 100% | 50% |
| copper | 100% | 90% |

Comparative Example 2

The composition of Example 2 was prepared without Components D2. After testing for adhesion 0% cohesive failure was noticed in all cases (i.e. no adhesion).

EXAMPLE 3

The composition of Example 2 was prepared by replacing Component D2 with Component D4. The composition was coated onto sheets as explained in Example 1 and one set was cured at 100° C. for 1 hour, while another set was cured at 80° C. for 2 hours. After storage for 24 hours they were tested for cohesive failure. Test results in % cohesive failure are given in Table II.

TABLE II

| sheet | cured 100° C. | cured 80° C. |
| --- | --- | --- |
| aluminium | 100% | 100% |
| GFR epoxy resin | 100% | 90% |
| glass | 100% | 90% |
| copper | 100% | 100% |

Comparative Example 3

The composition of Example 3 was prepared without Components D4. After testing for adhesion, 0% cohesive failure was noticed in all cases (i.e. no adhesion).

EXAMPLES 4 AND 5

A composition was prepared by mixing 93.1 parts of a dimethylvinylsiloxane end-blocked polydimethylsiloxane having a viscosity of 450 mPa.s, 93.1 parts by weight of an inert ground quartz filler, 7.2 parts of a black paste containing 80.1% of a dimethylvinylsiloxane end-blocked polydimethylsiloxane having a viscosity of 450 mPa.s, 13.3% of zinc oxide and 6.6% of carbon black, 0.2 part of a solution of a platinum complex containing 0.6% platinum, 6.3 parts of a trimethylsiloxane end-blocked polydimethylsiloxane having 37.5 mole % dimethylsiloxane units and 62.5% methylhydrogensiloxane units and 0.1 part of polymethylvinylcyclosiloxane. To this composition was added 2 parts of Component D2 (Example 4) or 2 parts of Component D2 and 0.2 part of water (Example 5). The mixed and de-gassed blends were poured into 3 cups for each Example so that the levels of uncured material were 20 mm high. Into each cup were placed vertically 3 strips of aluminium 30 mm from each other. The cups were then placed in an oven at 80° C. for 2 hours. Afterwards one cup for each Example was stored at room temperature for 24 hours, another for 48 hours and a third for 72 hours. The cohesive failure for the strips was then tested and results are given in Table III.

TABLE III

| Storage time | Example 4 | Example 5 |
| --- | --- | --- |
| 24 hours | 0% | 5% |
| 48 hours | 0% | 50% |
| 72 hours | 0% | 70% |

EXAMPLES 6 AND 7

A composition was prepared by mixing 117.7 parts of a dimethylvinylsiloxane end-blocked polydimethylsiloxane having a viscosity of 450 mPa.s, 63.6 parts by weight of an inert ground quartz filler, 7.9 parts of a black paste containing 80.1% of a dimethylvinylsiloxane end-blocked polydimethylsiloxane having a viscosity of 450 mPa.s, 13.3% of zinc oxide and 6.6% of carbon black, 0.3 part of a solution of a platinum complex containing 0.6% platinum, 7 parts of a trimethylsiloxane end-blocked polydimethylsiloxane having 37.5 mole % dimethylsiloxane units and 62.5% methylhydrogensiloxane units and 3.5 parts of a blend containing 50% [3,(2,3-epoxypropoxy)-propyl]-trimethoxysilane and 50% of a hydroxy end-blocked polymethylvinylsiloxane having a viscosity of 10 mPa.s. To this composition was added 2 parts of Component D1 and 2 parts of Component D2 (Example 6) or 2 parts of Component D3 and 2 parts of Component D4 (Example 7). The compositions were then coated onto sheets of GFR epoxy resin, polyethylene terephthalate (PEPT) and polyamide (PA6) with a layer of 1 to 2 mm. The coated sheets were then placed in an oven for one hour at 100° C. and after removal from the oven the cured silicone elastomer was attempted to be peeled away from the sheets, and the amount of cohesive failure noted (100% cohesive failure means 100% adhesion). Results are given in Table IV.

TABLE IV

| sheet | Example 6 | Example 7 |
| --- | --- | --- |
| GFR epoxy resin | 100% | 100% |
| PEPT | 100% | 100% |
| PA6 | 100% | 50% |

Comparative Example 4

The composition of Examples 6 and 7 was prepared without Components D2 or D4, Test results are given in Table V.

TABLE V

| sheet | cohesive failure |
| --- | --- |
| GFR epoxy resin | 60% |
| PEPT | 20% |
| PA6 | 5% |

That which is claimed is:

1. An elastomer-forming silicone composition comprising (A) an organopolysiloxane having an average of about two silicon-bonded vinyl groups per molecule, (B) an organosilicon compound having on average at least 3 silicon-bonded hydrogen atoms per molecule, (C) a noble metal catalyst and (D) an adhesion promoter which is the product of the mixture or reaction of (1) an organosiloxane compound having at least two trialkoxysilyl groups of the formula -R'Si(OR")$_3$ linked to a silicon atom wherein R' denotes a divalent hydrocarbon linkage and R" denotes an alkyl group having up to 6 carbon atoms with (2) an unsaturated alcohol having at least one -CZ$_2$-OH group and at least one $\alpha,\beta$-unsaturated alkenyl group and having the general formula [HO-C$_i$Z$_{2i}$]$_a$-C-(R")$_{4-a-b}$-[X-CH=CH$_2$]$_b$ wherein Z is selected from the group consisting of hydrogen and groups R", X is selected from the group consisting of divalent hydrocarbon groups and divalent hydrocarbon groups having ether oxygen linkages, a and b independently have a value of from 1 to 3, the sum of a+b having a value of from 2 to 4 and i has a value of from 1 to 12.

2. A composition according to claim 1 wherein organopolysiloxane (A) has the general formula Vi-[SiR$_2$O]$_n$-SiR$_2$Vi wherein Vi denotes a vinyl group, R denotes an organic group which is selected from the group consisting of monovalent hydrocarbon groups and halogen-substituted hydrocarbon groups having at most 8 carbon atoms per group, and wherein n is an integer.

3. A composition according to claim 1 wherein organopolysiloxane (A) is a $\alpha$,w-vinyl end-blocked polydimethylsiloxane.

4. A composition according to claim 1 wherein organosilicon compound (B) has at least 5 silicon-bonded hydrogen atoms per molecule and is selected from the group consisting of copolymers of trimethylsiloxane units and methylhydrogensiloxane units and copolymers of trimethylsiloxane units, methylhydrogensiloxane units and dimethylsiloxane units said compound (B) having a viscosity of from 15 to about 500 mm$^2$/s at 25° C.

5. A composition according to claim 1 wherein siloxane (1) of Component (D) is a short chain material having no more than 20 silicon atoms, wherein at least 80% of all R" groups are methyl groups and the group R' denotes a divalent hydrocarbon group having from 2 to 6 carbon atoms.

6. A composition according to claim 5, wherein siloxane (1) is Si[OSi(CH$_3$)$_2$-CH$_2$CH$_2$-Si(OCH$_3$)$_3$]$_4$.

7. A composition according to claim 5 wherein siloxane (1) is

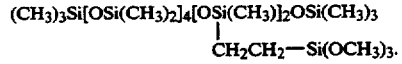

8. A composition according to claim 1 wherein unsaturated alcohol (2) is an allylether of a polyol having at least one -COH group and one allyl group.

9. A composition according to claim 8 wherein unsaturated alcohol (2) comprises trimethylolpropanemonoallylether.

10. A composition according to claim 8 wherein unsaturated alcohol (2) comprises trimethylolpropanediallylether.

11. A composition according to claim 1 which also comprises a small amount of water.

* * * * *